United States Patent
Chavali et al.

(10) Patent No.: US 9,660,709 B1
(45) Date of Patent: May 23, 2017

(54) SYSTEMS AND METHODS FOR CALCULATING LOG-LIKELIHOOD RATIOS IN A MIMO DETECTOR

(71) Applicant: Uurmi Systems Pvt Ltd, Telangana (IN)

(72) Inventors: Nanda Kishore Chavali, Telangana (IN); Anvesh Reddy Yalla, Telangana (IN)

(73) Assignee: UURMI SYSTEMS PVT. LTD., Telangana (IN)

( * ) Notice: Subject to any disclaimer, the term of this patent is extended or adjusted under 35 U.S.C. 154(b) by 0 days.

(21) Appl. No.: 14/960,170

(22) Filed: Dec. 4, 2015

(51) Int. Cl.
*H04L 27/00* (2006.01)
*H04L 27/06* (2006.01)
*H04B 7/0456* (2017.01)
*H04L 5/00* (2006.01)
*H04L 1/00* (2006.01)
*H04B 1/7105* (2011.01)

(52) U.S. Cl.
CPC ....... *H04B 7/0456* (2013.01); *H04B 1/71057* (2013.01); *H04L 1/0054* (2013.01); *H04L 5/0007* (2013.01)

(58) Field of Classification Search
USPC ....... 375/219, 220, 221, 222, 226, 227, 240, 375/240.26–240.27, 254, 267, 262, 265, 375/277, 278, 279, 284, 285, 295, 299, 375/316, 322, 324, 325, 340, 341, 342, 375/349, 354, 362
See application file for complete search history.

(56) References Cited

U.S. PATENT DOCUMENTS

| | | | | |
|---|---|---|---|---|
| 6,377,607 B1* | 4/2002 | Ling | ................. | H03M 13/2957 375/130 |
| 7,590,167 B2* | 9/2009 | Fulghum | ................ | H04B 1/712 375/148 |
| 7,769,078 B2* | 8/2010 | Cairns | ................. | H04B 1/7117 375/147 |
| 8,275,076 B2* | 9/2012 | Jung | .................... | H04B 7/0854 375/316 |
| 8,731,949 B2* | 5/2014 | Jiang | .................. | H03M 7/3082 704/226 |
| 8,761,321 B2* | 6/2014 | Thomas | ............... | H04B 1/1027 370/310 |
| 8,824,585 B2* | 9/2014 | Sakai | ................... | H04B 7/0417 375/267 |
| 8,831,111 B2* | 9/2014 | Au | ....................... | H04N 19/577 375/240.29 |
| 2005/0069023 A1* | 3/2005 | Bottomley | ............ | H04B 1/711 375/148 |
| 2007/0047628 A1* | 3/2007 | Fulghum | ............... | H04B 1/712 375/148 |

(Continued)

*Primary Examiner* — Linda Wong
(74) *Attorney, Agent, or Firm* — Next IP Law Group

(57) ABSTRACT

A method and a communication receiver have been described for calculating log-likelihood ratios in a communication receiver. The log-likelihood ratio is calculated for each bit of one or more subsymbols of each of the one or more spatial streams by computing effective noise on one or more spatial streams after considering noise terms resulting from MIMO detection estimates of the subsymbols on each spatial stream. Finally, signal to noise ratio is determined for one or more spatial streams from the effective noise and scaling bit log-likelihood ratios with the signal to noise ratio.

9 Claims, 6 Drawing Sheets

(56) References Cited

U.S. PATENT DOCUMENTS

| | | | |
|---|---|---|---|
| 2007/0071147 A1* | 3/2007 | Sampath | H04B 7/0404 375/347 |
| 2007/0110191 A1* | 5/2007 | Kim | H04L 1/0052 375/340 |
| 2008/0019331 A1* | 1/2008 | Thomas | H04L 1/0052 370/338 |
| 2008/0019468 A1* | 1/2008 | Ammer | H03M 13/2957 375/350 |
| 2008/0077839 A1* | 3/2008 | Gross | H03M 13/1105 714/755 |
| 2008/0267262 A1* | 10/2008 | Cairns | H04B 1/71055 375/148 |
| 2008/0285655 A1* | 11/2008 | Au | H04N 19/577 375/240.16 |
| 2009/0220034 A1* | 9/2009 | Ramprashad | H04L 1/0048 375/341 |
| 2013/0051444 A1* | 2/2013 | Roh | H04L 25/067 375/222 |
| 2015/0180682 A1* | 6/2015 | Paker | H04L 25/0246 375/232 |
| 2016/0105294 A1* | 4/2016 | Hasegawa | H04L 25/0242 375/341 |
| 2016/0150438 A1* | 5/2016 | Rawlins | H04W 28/0221 370/311 |

\* cited by examiner

SYSTEMS AND METHODS FOR CALCULATING LOG-LIKELIHOOD RATIOS IN A MIMO DETECTOR

FIELD OF THE DISCLOSURE

The presently disclosed embodiments are generally related to wireless communication, and more particularly to soft demapping for log-likelihood ratio (LLR) computation in coded MIMO-OFDM systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Orthogonal Frequency Division Multiplexing (OFDM) is a modulation technique that is used in many wireless and telecommunications standards. OFDM is a modulation technique in which a high rate data stream is divided into many low rate parallel data streams and each is modulated using a separate narrowband close-spaced subcarrier thereby making the data stream less sensitive to frequency selective fading. A multiple-input multiple-output (MIMO) communication system employs multiple transmitting antennas and multiple receiving antennas for data transmission. A MIMO channel formed by the transmitting antennas and receiving antennas may be decomposed into independent channels. Each independent channel may also be referred to as a spatial subchannel of the MIMO channel. The MIMO system provides improved performance over that of a single-input single-output (SISO) communication system if the additional dimensionalities created by the multiple transmit and receive antennas are utilized.

There has been increased demand for throughput, spectral efficiency, and improved link reliability in wireless communication systems. To meet this demand, orthogonal frequency division multiplexing (OFDM) is combined with multiple input multiple output (MIMO) signal processing and employed in many wireless standards including wireless LAN. In such techniques, OFDM is employed as a multi-carrier modulation scheme wherein data is transmitted on many orthogonal subcarriers to combat the effects of multipath channel, and MIMO signal processing is used to increase the throughput of the radio link by increasing the number of transmit and receive antennas. In a MIMO-OFDM system, modulated signals corresponding to independent data streams are transmitted from the multiple transmitting antennas of a transmitter that are then received by the multiple receiving antennas at the receiver. The receiver upon receiving the multiple signals, utilizes various MIMO detection schemes such as maximum likelihood (ML), zero forcing (ZF) and minimum mean squared error (MMSE) to detect the data symbols from multiple signals corresponding to each subcarrier after OFDM demodulation. A forward error correction (FEC) code is employed to improve the bit error rate performance in a MIMO-OFDM system also known as a coded MIMO-OFDM system. In coded MIMO-OFDM systems, the MIMO detector may provide either hard bits (either 1's or −1's) or soft bits (having the same sign as hard bits, but with magnitude indicating the reliability of the decision) to the FEC decoder. The performance of the FEC decoder may be improved by the soft bits, whose soft information is in the form of log likelihood ratios (LLR's). Therefore, it is desirable to employ a soft demapper in the coded MIMO-OFDM system to provide the soft bits to the FEC decoder.

A number of methods have been proposed which claim to provide the above mentioned facilities. In one such method, a soft MIMO demapper based on ZF and MMSE equalizers is proposed but its complexity is exponential in number of transmitted streams thus making its practical implementation difficult. In another such method, a receiver includes an inner decoder structure having a soft output M-algorithm (SOMA) based multiple-in multiple-out (MIMO) joint demapper that uses a SOMA-based MIMO detection process to perform joint inner demapping over each tone. In yet another method, a MMSE MIMO detector by using QR decomposition (QRD) of the augmented channel matrix is presented including a bias removal technique to decode the data on each stream by permuting the augmented channel matrix and computing its QRD on each stream. However, such soft demapping techniques proposed by the existing methods are cumbersome and are computationally intensive. Hence, there exists a need for providing a method and a soft demapper implementing the method for determining Log-Likelihood ratios that is practically implementable and achieves performance close to the near optimal-ML receiver even in delay spread channels.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method for calculating log-likelihood ratios in a communication receiver is described. The method comprises receiving, by the communication receiver, samples of one or more spatial streams. One or more demodulated samples of the received samples are determined by applying one or more discrete Fourier transforms. One or more subsymbols are determined from the demodulated samples by utilizing a MIMO detection method. A log-likelihood ratio is then determined for each bit of one or more subsymbols of each of the one or more spatial streams. The method of calculating log-likelihood ratio for each bit comprises computing effective noise on one or more spatial streams after considering noise terms resulting from the MIMO detection estimates of one of more subsymbols on one or more spatial streams by the one or more processors. Finally, a signal to noise ratio is determined by the one or more processors, on one or more spatial streams from the effective noise and the bit log-likelihood ratios are scaled with the signal to noise ratio.

In another example embodiment, a communication receiver comprising a MIMO detector for calculating log-likelihood ratios is described. The MIMO detector comprises a QR decomposition unit, a Backsolving unit, a Soft demapper unit, and an SNR scaling unit. The QR decomposition unit is configured to compute QR decomposition of an augmented MIMO channel matrix corresponding to one or more spatial streams on one or more subcarriers. The Backsolving unit is configured to compute MIMO detection estimates of one or more subsymbols corresponding to the one or more spatial streams on the one or more subcarriers. The Soft demapper unit is configured to compute bit log-likelihood ratios of each bit of the one or more subsymbols corresponding to the one or more spatial streams on the one or more subcarriers. The Soft demapper unit comprises a Noise Coefficient Computation Unit. The Noise Coefficient Computation Unit is configured for calculating effective noise term $z_i(k)$ in the $i^{th}$ spatial stream on $k^{th}$ subcarrier, wherein $$z_i(k) = \sum_{j=i}^{n_T} c_{ij}(k)\hat{n}_j(k)$$

such that coefficient $c_{ij}(k)$ corresponds to the contribution of the noise term in the $j^{th}$ stream to the overall noise in the $i^{th}$ stream on $k^{th}$ subcarrier. The SNR scaling unit of the MIMO detector is configured for estimating signal to noise ratio from the effective noise term $z_i(k)$ in the $i^{th}$ stream and computing the bit log likelihood ratio for each of the encoded bits of the subsymbol in the $i^{th}$ spatial stream on $k^{th}$ subcarrier, wherein the bit log likelihood ratio is a function of effective signal to noise ratio in the $i^{th}$ spatial stream which is estimated after considering the noise terms resulting from the MIMO detection estimation of one or more subsymbols corresponding to one or more spatial streams on one or more subcarriers.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
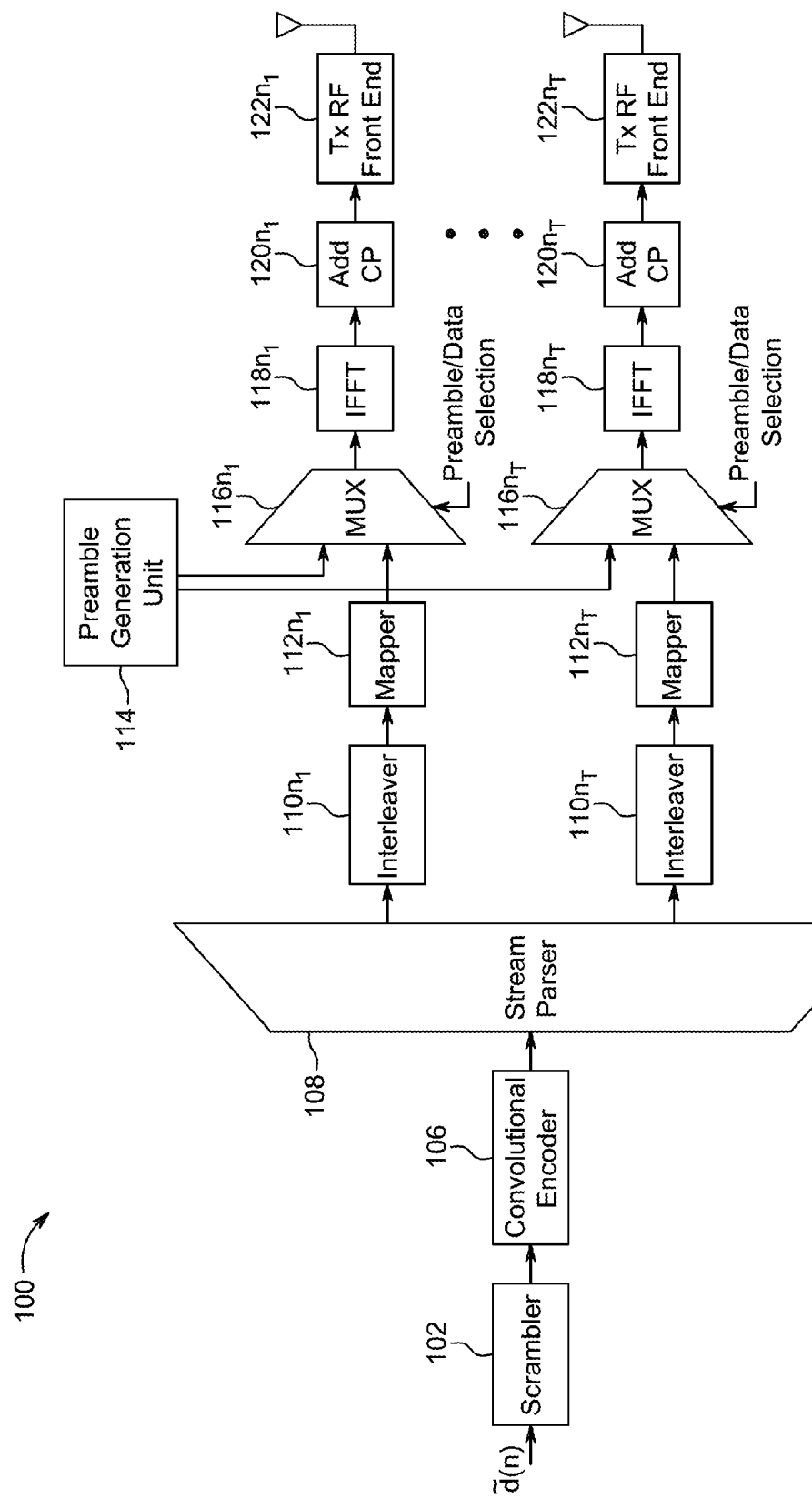
FIG. 1 illustrates a transmitter in a coded MIMO-OFDM system, according to an example embodiment.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The existing techniques for soft demapper require matrix inversions or multiple iterations of QR decomposition, which is computationally intensive.

The method for MIMO soft demapping described herein computes bit Log-Likelihood Ratios (LLRs) with minimal complexity while achieving the performance close to that of the Maximum likelihood (ML) receiver which is ideal in terms of packet error rate (PER) performance. A general soft demapper in MIMO detector uses the change in noise variance during the detection process on each subcarrier to improve the system performance. However, the soft demapping techniques in MIMO systems are cumbersome and are computationally intensive.

According to the disclosed methods and systems the bit LLRs are computed in a single iteration of QR decomposition and without any matrix inversion which makes it practically implementable. The described method while computing bit LLR's for PSK/QAM subsymbols in a particular stream considers the interference from subsymbols in other spatial streams. As a result, the performance of the MIMO detector with the disclosed technique is close to that of the Maximum likelihood (ML) receiver. Unlike in an ML receiver where LLRs are calculated jointly for all layers, a per data stream LLR calculation approach is followed in the MIMO detector with proposed soft demapper, thereby reducing the complexity. Further, the proposed technique can be easily extended to any higher order MIMO-OFDM system with a linear increase in complexity. One skilled in the art would appreciate the fact that in the proposed systems and methods the noise variance on each subcarrier is computed by considering the interference terms from the other spatial streams. It intelligently combines equalization and soft demapping processes to eliminate the interference terms effectively and achieves performance close to the near optimal-ML receiver even in delay spread channels.

FIG. 1 illustrates a transmitter block diagram with $n_T$ antennas in coded MIMO-OFDM system of a disclosed apparatus, according to an example embodiment. The transmitter 100 comprises of $n_T$ antennas ($122n_1$ to $122n_T$) in coded MIMO-OFDM. An input bit sequence d(n) is initially fed to a scrambler 102 which is an encrypting device wherein the data is mixed up in a digital stream of information. The scrambler 102 transposes or inverts the data stream to make the data stream unintelligible at a receiver that is not equipped with an appropriately set descrambling unit. The scrambler 102 also prevents long sequences of zeros or ones.

The scrambled data stream from the scrambler 102 is then sent to a convolutional encoder 106 which is a type of error-correcting coding for generation of parity symbols via a sliding application of a Boolean polynomial function to the data stream. In an aspect, the encoder 106 may be an FEC encoder that encodes the data stream to enable error correction.

The encoded data stream is then sent to a stream parser 108 that parses the scrambled data stream into $n_T$ spatial streams before interleaving, which is a process or methodology to make a system more efficient, fast and reliable by arranging data in a non contiguous manner. The stream parser 108 divides the output of the convolutional encoder 106 into multiple spatial streams that are then individually sent to different interleavers ($110n_1$ to $110n_T$) and mappers ($112n_1$ to $112n_T$).

Each interleaver ($110n_1$ to $110n_T$) permutes the ordering of each spatial stream in a deterministic manner. The subsequent interleaved bits from each interleaver ($110n_1$ to $110n_T$) of the $i^{th}$ spatial stream are mapped to subsymbols in the constellation set S (having size M) using complex PSK/QAM constellation by a mapper ($112n_1$ to $112n_T$). The mapper ($112n_1$ to $112n_T$) may map a group of $\log_2(M)$ bits onto a point in complex constellation. The mapping may be done using some complex constellation, such as binary phase-shift keying (BPSK), quadrature phase-shift keying (QPSK), 8 phase-shift keying (8PSK), quadrature amplitude modulation (QAM), etc. The mapper ($112n_1$ to $112n_T$) may output N such symbols, each symbol stream corresponding to one of the N orthogonal subcarriers of. These N parallel symbols are represented in the frequency domain and may be converted into time domain samples by an IFFT component ($118n_1$ to $118n_T$).

The preamble generation unit (114) generates a preamble sequence prior to the transmission of data symbols that is added to each spatial stream. The preamble sequence may consist of LSTF's (legacy short training fields) and LLTF's (legacy long training fields) by which the timing and frequency synchronizations are facilitated. Additionally, the preamble sequence may contain signal fields that transmit the PHY layer parameters such as modulation and coding scheme, number of spatial streams, payload length, etc. After transmission of the preamble, the data portion may be transmitted.

The subsymbols are then mapped across data subcarriers of OFDM symbol via multiplexer ($116n_1$ to $116n_T$). OFDM modulation is performed and time domain transmit signal is obtained by using IFFT which is performed in an IFFT unit ($118n_1$ to $118n_T$). A cyclic prefix (CP) of length L is prepended to the time domain signal in a CP prepending unit ($120n_1$ to $120n_T$) and transmitted on $i^{th}$ transmit antenna ($122n_1$ to $122n_T$) before analog processing. This signal with all modified characteristics and modulation schemes is thus transmitted wirelessly by transmitter and is receipted by a receiver 200.

Figure 2:
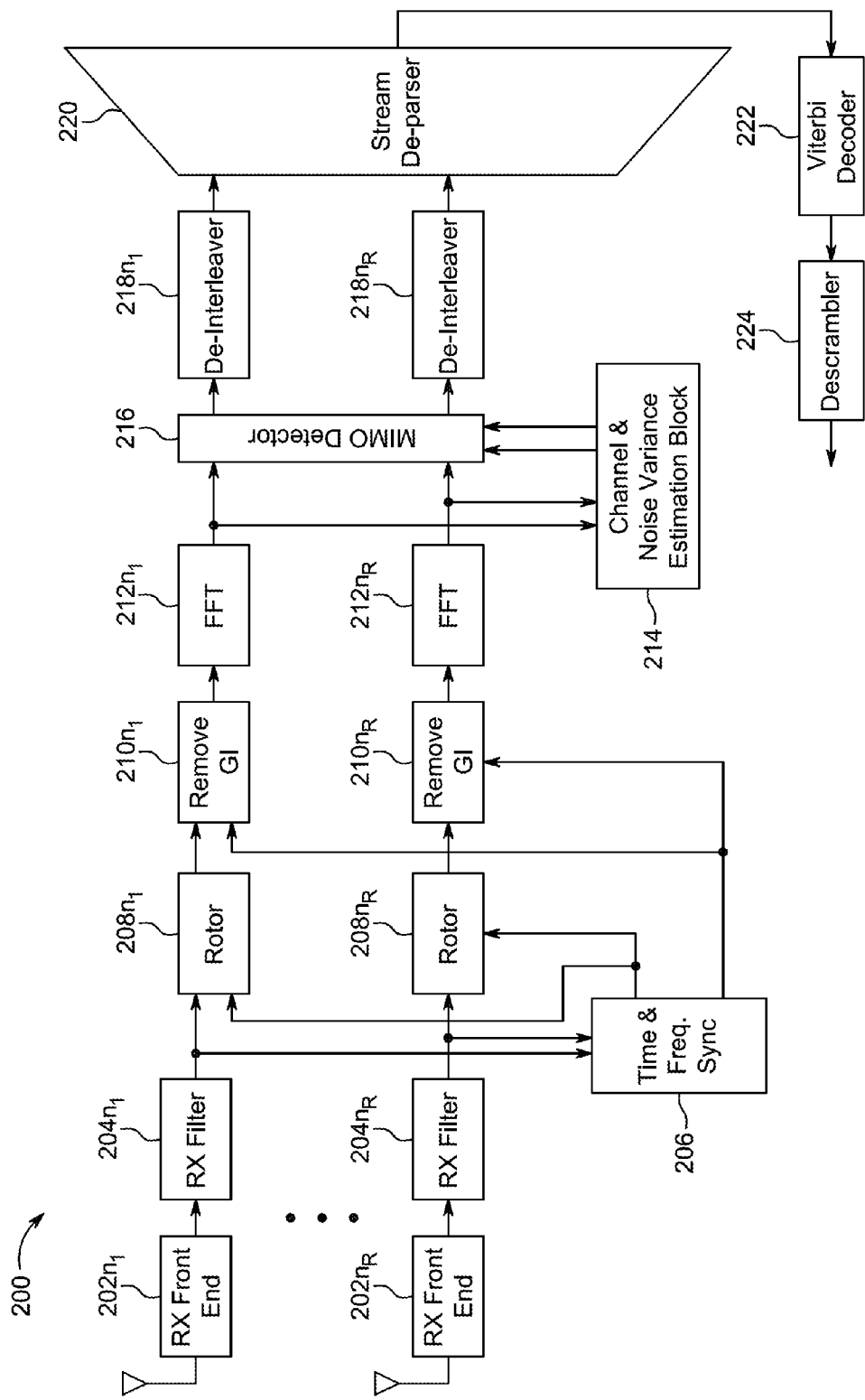
FIG. 2 illustrates a transmitter in a coded MIMO-OFDM system, according to an example embodiment.

FIG. 2 illustrates a receiver 200 with antennas ($202n_1$ to $202n_R$) in coded MIMO-OFDM system. The transmitted signals from the transmitter are received wirelessly by receiver antenna modules ($202n_1$ to $202n_R$). Receiver antenna modules ($202n_1$ to $202n_R$) may down convert the received RF signal to baseband and perform analog to digital conversion to provide digital samples. It is followed by a receiver filter ($204n_1$ to $204n_R$) to remove out of band thermal noise.

The time and frequency synchronization module 206 may perform coarse time and frequency synchronizations during LSTF's and fine time and frequency synchronizations during LLTF's. The estimated frequency offset on each stream is then corrected by a rotor module ($208n_1$ to $208n_R$) while the timing offset is corrected within the Remove GI (guard interval) module ($210n_1$ to $210n_R$). Cyclic prefix which is prefixing of a symbol with a repetition of the end for each OFDM symbol is also removed in the Remove GI module ($210n_1$ to $210n_R$). Then OFDM demodulation is performed by a FFT module ($212n_1$ to $212n_R$), to obtain frequency domain subsymbols.

During LLTF's, the output of FFT module is used by the channel and noise variance estimation module 214 to estimate legacy channel and compute noise variance. This legacy channel estimate is used to decode the signal fields (L-SIG and VHT-SIG A) which may provide parameters required to decode data at the receiver. VHT PPDU (Very High Throughput—Physical Layer Protocol Data Units) may also contain VHT-LTF's for estimating MIMO channel in the frequency domain, using which MIMO detector module 216, may estimate transmitted data subsymbols.

If length of a cyclic prefix is larger than channel delay spread, then timing and frequency synchronization may be performed for calculating a received vector at output. Received vector at the output of the FFT block in $k^{th}$ subcarrier may be given by equation (1):

$$y(k)=H(k)x(k)+n(k);\ k=0,1,2\ \ldots\ N-1, \quad (1)$$

wherein; $y(k)=[y_1(k), y_2(k), \ldots, y_{n_R}(k)]^T$ is a column vector of dimension $n_R \times 1$, $x(k)=[x_1(k), x_2(k), \ldots, x_{n_T}(k)]^T$ is a $n_T \times 1$ vector of QAM subsymbols transmitted in the $k^{th}$ subcarrier, $n(k)=[n_1(k), n_2(k), \ldots, n_{n_R}(k)]^T$ is a $n_R \times 1$ complex additive white Gaussian noise (AWGN) vector with covariance matrix $R_{nn}=\sigma^2 I$, and N is the total number of data subcarriers. H(k) is a $n_R \times n_T$ MIMO channel frequency response matrix in the $k^{th}$ sub-carrier and may be given by $$H(k) = \begin{bmatrix} h_{11}(k) & h_{12}(k) & \ldots & h_{1n_T}(k) \\ h_{21}(k) & h_{22}(k) & \ldots & h_{2n_T}(k) \\ \ldots & \ldots & \ldots & \ldots \\ h_{n_R 1}(k) & h_{n_R 2}(k) & \ldots & h_{n_R n_T}(k) \end{bmatrix}$$

Elements of H(k) may be independent and identically distributed (i.i.d) zero mean circularly symmetric complex Gaussian.

Now received vector y(k) and channel matrix H(k) may be used to estimate transmitted subsymbols and bit LLR's for each of these subsymbols may be computed by MIMO detector 216. The computed bit LLR's are then passed through a deinterleaver ($218n_1$ to $218n_R$). The deinterleaver ($218n_1$ to $218n_R$) at the receiver applies the inverse permutation to restore the sequence of transmitted symbols to its original order. Then the data stream is deparsed by the stream deparser 220 before giving to a Viterbi decoder 222, which is a soft decision decoder. The decoded bits from the soft decision decoder are finally passed through a descrambler 224.

In an aspect, the MIMO detector 216 may perform either Maximum Likelihood (ML) or zero forcing (ZF) or minimum mean squared error (MMSE) detection. ML detector is optimal in terms of PER performance but its complexity may grow exponentially with the number of transmitted streams. Sub-optimal detectors employing ZF/MMSE criteria have been proposed in the current state of art to achieve near ML performance at reduced complexity, but these detectors may require computation of matrix inversion. Direct computation of matrix inversion may be numerically unstable, hence alternate method such as QR decomposition (QRD) is proposed in current disclosure. In QRD, channel matrix H(k) is decomposed into a product of unitary matrix Q(k) and an upper triangular matrix R(k). Using an upper triangular property of R(k) matrix, transmit subsymbols on all the spatial streams may be estimated. The soft demapper may then compute LLR for each coded bit $b_i^l(k)$ (where l=1, 2 ... log$_2$M) of subsymbol $x_i(k)$ in the $i^{th}$ spatial stream. The MIMO detector 216 is further described in FIG. 3.

In an example embodiment, the transmitter 100 and the receiver 200 may include one or more processors for executing instructions stored in a memory. The processor may also be configured to decode and execute any instructions received from another transmitter or receiver. The processor may include one or more general purpose processors (e.g., INTEL microprocessors) and/or one or more special purpose processors (e.g., digital signal processors). The processor may be configured to execute computer-readable program instructions, such as program instructions to carry out any of the functions described in this description. In an aspect, the one or more processors may be a field-programmable gate array (FPGA). The memory may include a computer readable medium. A computer readable medium may include volatile and/or non-volatile storage components, such as optical, magnetic, organic or other memory or disc storage, which may be integrated in whole or in part with the processor. Alternatively, the entire computer readable medium may be remote from the processor and coupled to the processor by connection mechanism and/or network cable. Memory may be enabled to store various types of data. For instance, memory may store one or more identifiers related to the transmitter and the receiver and data received from the transmitter and the receiver and computer-readable program instructions executable the by processor.

Figure 3:
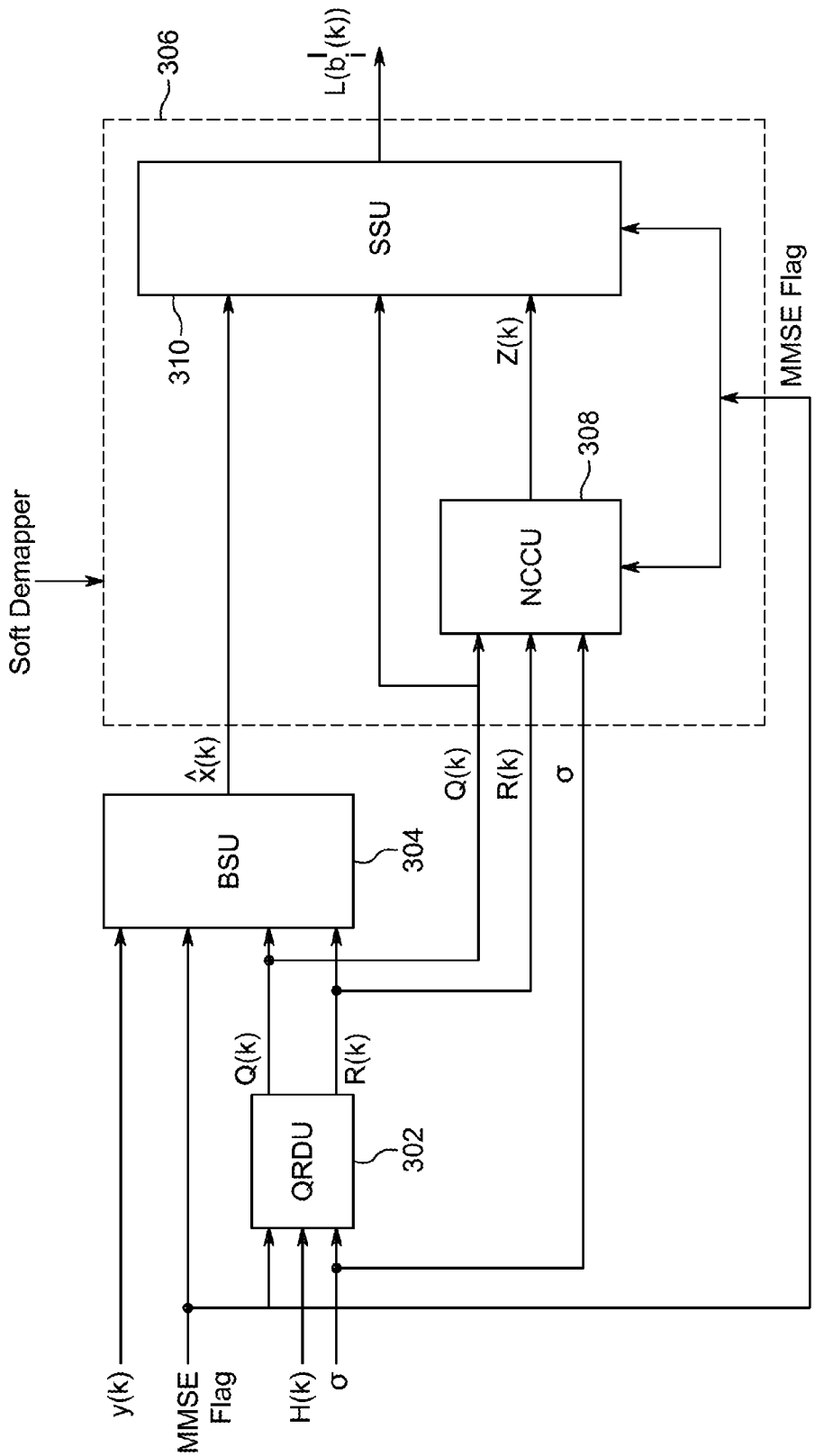
FIG. 3 illustrates a block diagram of a QR Based ZF/MMSE MIMO detector with proposed soft demapper, according to an example embodiment.

FIG. 3 illustrates a block diagram of a QR Based ZF/MMSE MIMO detector with proposed soft demapper, according to an example embodiment. The MIMO detector includes basic working units such as QRDU 302, BSU 304, and proposed soft demapper 306 that may include NCCU 308, and SSU 310, to compute bit LLR. All mentioned units are discussed later in this disclosure. MMSE Flag may differentiate mode of detection used in detector. MMSE version of a MIMO detector is generally termed as QR-MMSE MIMO detector and ZF version as QR-ZF MIMO detector.

QR decomposition unit (QRDU) 302, may perform QR decomposition (QRD) of channel matrix H(k) at each sub-carrier into Q(k) and R(k) matrices. The QRD of H(k) may be given by equation (2):

$$H(k)=Q(k)R(k) \quad (2)$$

For decomposing a channel matrix, any of the existing methods for QR decomposition such as Householder transformations or Givens rotation may be used. If MMSE mode is indicated by MMSE flag to QRDU 302, channel augmentation may be additionally performed before computing QRD of an augmented matrix. In an aspect, augmented channel matrix $H_{aug}(k)$ may be constructed such that a weight matrix for ZF equalization using an augmented channel $H_{aug}(k)$ is equivalent to that of MMSE equalization for a channel H(k).

$$H_{aug}(k) = \begin{bmatrix} H(k) \\ \sigma I_{n_T} \end{bmatrix} = \begin{bmatrix} Q_1(k) \\ Q_2(k) \end{bmatrix} R(k) \quad (3)$$

Again referring to FIG. 3, Back Solving Unit (BSU) 304, may compute ZF/MMSE estimates of subsymbol vector x(k) from the received vector y(k) using Q(k) and R(k) matrices. If MMSE mode is indicated by MMSE flag, BSU 304 may compute MMSE estimate else it may compute a ZF estimate. Upper triangular property of a R(k) matrix may be used by BSU 304, to estimate the transmit subsymbols one by one, beginning with last spatial stream and ending in first spatial stream. While estimating a transmit subsymbol $x_i(k)$ in $i^{th}$ spatial stream, interference of subsymbols $x_{i+1}(k)$, $x_{i+2}(k)$ ... $x_{n_T}(k)$ may be removed using their estimates. The procedure to compute ZF and MMSE estimate of subsymbols is detailed in following example embodiments.

To compute ZF and MMSE estimate of subsymbols for BSU 304, in QR-ZF MIMO detector with MMSE Flag=0; equation (2) may be used in MIMO system model given by equation (1) to get equation (4):

$$y(k)=Q(k)R(k)x(k)+n(k) \quad (5)$$

Equation (5) may be pre-multiplied by $Q^\dagger(k)$ to get equation (6):

$$\hat{y}(k) = R(k)x(k) + \quad (6)$$

$$\hat{n}(k) \begin{bmatrix} \hat{y}_1(k) \\ \hat{y}_2(k) \\ \vdots \\ \vdots \\ \hat{y}_{n_T}(k) \end{bmatrix} = \begin{bmatrix} r_{11}(k) & r_{12}(k) & \dots & r_{1n_T}(k) \\ 0 & r_{22}(k) & \dots & r_{2n_T}(k) \\ \dots & 0 & \dots & \dots \\ \dots & \dots & \dots & \dots \\ 0 & 0 & \dots & r_{n_T n_T}(k) \end{bmatrix} \begin{bmatrix} x_1(k) \\ x_2(k) \\ \vdots \\ \vdots \\ x_{n_T}(k) \end{bmatrix} + \begin{bmatrix} \hat{n}_1(k) \\ \hat{n}_2(k) \\ \vdots \\ \vdots \\ \hat{n}_{n_T}(k) \end{bmatrix}$$

wherein, $\hat{y}(k)=Q^\dagger(k)y(k)$ may represent a modified receive vector and $\hat{n}(k)=Q^\dagger(k)n(k)$ may represent modified noise factor. For a unitary matrix Q(k), a covariance matrix of $\hat{n}(k)$ may remain same on pre-multiplication with $Q^\dagger(k)$.

From a set of equations in (6), first ZF estimate of subsymbol $x_{n_T}(k)$ may be computed in a $n_T^{th}$ spatial stream. After estimating $x_{n_T}(k)$, ZF estimate of $x_{n_T-1}(k)$ may be computed by removing interference of $x_{n_T}(k)$ from $\hat{y}_{n_T-1}(k)$ using its estimate. In general, ZF estimate $\hat{x}_i(k)$ of subsymbol $x_i(k)$ in an $i^{th}$ spatial stream after removing an interference of data subsymbols $x_{i+1}(k)$, $x_{i+2}(k)$ ... $x_{n_T}(k)$ from a modified received symbol $\hat{y}_i(k)$, may be represented by equation (7):

$$\hat{x}_i(k) = \frac{\hat{y}_i(k) - \sum_{j=i+1}^{n_T} r_{ij}(k)\hat{x}_j(k)}{r_{ii}(k)} \quad (7)$$

Now to compute ZF and MMSE estimate of subsymbols for BSU 304, in QR-ZF MIMO detector with MMSE Flag=1; BSU 304 in QR-MMSE MIMO detector may estimate soft symbols using Q(k) and R(k) matrices obtained via QRD of an augmented matrix $H_{aug}$ (k). Equation (1) may be pre-multiplied by $Q_1^\dagger(k)$ and equation (3) may be used to get a modified receive vector as equation (8):

$$\hat{y}(k) = Q_1^\dagger(k)H(k)x(k) + Q_1^\dagger(k)n(k) \quad (8)$$
$$= (R(k) - \sigma Q_2^\dagger(k))x(k) + Q_1^\dagger(k)n(k)$$

By following an approach for solving a system of equations as in BSU for QR-ZF detector, MMSE estimate $\hat{x}_i(k)$ of subsymbol $\hat{x}_i(k)$ in an $i^{th}$ spatial stream using QR-MMSE BSU may be expressed by equation (9) as follows:

$$\hat{x}_i(k) = \frac{\hat{y}_i(k) - \sum_{j=i+1}^{n_T}(r_{ij}(k) - \sigma q_{2,ij}(k))\hat{x}_j(k)}{r_{ii}(k) - \sigma q_{2,ii}(k)} \quad (9)$$

where $Q_2(k)=[q_{2,ij}]_{n_T \times n_T}$ and $\hat{y}(k)=[\hat{y}_1(k)\hat{y}^2(k) \ldots \hat{y}_{n_T}(k)]^T$. From equations (7) and (9), it may be observed that MMSE estimates may reduce to ZF estimates when noise variance $\sigma^2$ is zero.

Further referring to FIG. 3 in which a soft demapper module 306 is proposed, that may calculate bit LLR's separately for each stream. Let $b_i^l(k)$ denote a $l^{th}$ bit of a subsymbol $x_i(k)$ in a $k^{th}$ subcarrier and $i^{th}$ stream, where l=1, 2 . . . log$_2$M. Following equations (2) and (3), a bit LLR metric for $b_i^l(k)$ may be represented by equation (10):

$$L(b_i^l(k)) = \Gamma_i(k)\Delta(b_i^l(k)) \quad (10)$$

wherein, $\Gamma_i(k)$ is an effective SNR in an $i^{th}$ stream that may be computed and $$\Delta(b_i^l(k)) = \min_{\tilde{x}_i(k) \in S_0^l} |\hat{x}_i(k) - \tilde{x}_i(k)|^2 - \min_{\tilde{x}_i(k) \in S_1^l} |\hat{x}_i(k) - \tilde{x}_i(k)|^2$$

is the bit LLR for $b_i^l(k)$ as computed in equation (5) for various modulation schemes. Moreover, $\hat{x}_i(k)$ may be an estimated subsymbol from BSU, $\tilde{x}_i(k)$ may be any QAM constellation symbol that may belong to a constellation set S. $S_0^l$ may represent a set of QAM symbols having a bit 0 in $l^{th}$ position of $\tilde{x}_i(k)$ and $S_1^l$ may represent a set of QAM symbols having a bit 1 in $l^{th}$ position of $\tilde{x}_i(k)$.

In an example embodiment, SNR on each stream from noise coefficients may be computed in NCCU 308. Then soft bits $\Delta(b_i^l(k))$ may be scaled in SSU 310 using SNR estimate. Novelty lies in computation of effective noise variance in a particular stream after considering interference from other streams. One skilled in the art would appreciate that complexity of a proposed method is also significantly less compared to the existing methods as bit LLRs may be computed in a single iteration of QRD and without matrix inversion. Procedure for estimating SNR is different for QR-ZF and QR-MMSE detectors and a type of detector may again be selected by MMSE flag.

In FIG. 3 information from Q(k) and R(k) matrices may be utilized by a Noise Coefficient Computation Unit (NCCU) 308 to compute noise coefficients which may aid in estimating SNR, $\Gamma_i(k)$, of received signal in each stream.

ZF/MMSE estimate $\hat{x}_i(k)$ at the output of BSU 304 for $i^{th}$ spatial stream may be expressed as:

$$\hat{x}_i(k) = x_i(k) + z_i(k) \quad (11)$$

In equation (11), $x_i(k)$ is a transmitted subsymbol in an $i^{th}$ stream and $z_i(k)$ is an effective noise in $i^{th}$ stream. From equations (7) and (9) as well, it is clear that ZF/MMSE estimate in an $i^{th}$ spatial stream may depend on subsymbol estimates over 1+1, i+2 . . . $n_T$ streams which may make effective noise $z_i(k)$ in an $i^{th}$ stream a superposition of noise terms in all these streams. Hence, this effective noise term $z_i(k)$ in an $i^{th}$ stream may be expressed as a linear combination of these noise terms and may be represented as in equation (12):

$$z_i(k) = \sum_{j=1}^{n_T} c_{ij}(k)\hat{n}_j(k) \quad (12)$$

wherein, coefficient $c_{ij}(k)$ may correspond to a contribution of noise term in a $j^{th}$ stream to overall noise in an $i^{th}$ stream. Noise coefficients $c_{ij}(k)$ in equation (12) may be computed by NCCU unit 308. Noise coefficients for ZF and MMSE may be computed differently and hence, MMSE flag may indicate generation of discussed coefficients.

When MMSE Flag=0, then NCCU 308 in QR-ZF MIMO detector may compute noise coefficients in each stream considering ZF estimates from BSU 304. Generalized computation of noise coefficients for $n_T^{th}$ and $(n_T-1)^{th}$ streams is disclosed in an example embodiment.

When MMSE Flag=0, then NCCU 308 in QR-ZF MIMO detector may compute noise coefficients in each stream considering ZF estimates from BSU 304. Generalized computation of noise coefficients for $n_T^{th}$ and $(n_T-1)^{th}$ streams is disclosed in an example embodiment.

ZF estimate $\hat{x}_{n_T}(k)$ in a $n_T^{th}$ spatial stream from equations (6) and (7) for a QR-ZF MIMO detector may be expressed as:

$$\hat{x}_{n_T}(k) = \frac{\hat{y}_{n_T}(k)}{r_{n_T n_T}(k)} = x_{n_T}(k) + \frac{1}{r_{n_T n_T}(k)}\hat{n}_{n_T}(k) \quad (13)$$

Equations (11), (12) and (13) may be compared to get a noise coefficient as $$c_{n_T n_T}(k) = \frac{1}{r_{n_T n_T}(k)}$$

Since, R(k) matrix is an upper triangular, the coefficients $c_{n_T j}(k)$ may be zero for $j < n_T$.

Now, $x_{n_T-1}(k)$ may be solved by substituting an estimate of $\hat{x}_{n_T}(k)$ in equation (7), ZF estimate $\hat{x}_{n_T-1}(k)$ in $(n_T-1)^{th}$ spatial stream may be as follows:

$$\hat{x}_{n_T-1}(k) = \frac{\hat{y}_{n_T-1}(k) - r_{n_T-1 n_T}(k)\hat{x}_{n_T}(k)}{r_{n_T-1 n_T-1}(k)} \quad (14)$$
$$= \frac{\hat{y}_{n_T-1}(k)}{r_{n_T-1 n_T-1}(k)} - \frac{r_{n_T-1 n_T}(k)}{r_{n_T-1 n_T-1}(k)}x_{n_T}(k) -$$
$$\frac{r_{n_T-1 n_T}(k)}{r_{n_T-1 n_T-1}(k)r_{n_T n_T}(k)}\hat{n}_{n_T}(k)$$

Substituting for $y_{n_T-1}(k)$ using equation (6), equation (14) may be reduced to $$\hat{x}_{n_T-1}(k) = x_{n_T-1}(k) + \frac{1}{r_{n_T-1n_T-1}(k)}\hat{n}_{n_T-1}(k) - \frac{r_{n_T-1n_T}(k)}{r_{n_T-1n_T-1}(k)r_{n_Tn_T}(k)}\hat{n}_{n_T}(k) \quad (15)$$

Finally, noise coefficients for effective noise $z_{n_T-1}(k)$ may be retrieved from equations (12) and (15) as:

$$c_{n_T-1n_T-1}(k) = \frac{1}{r_{n_T-1n_T-1}(k)} \text{ and } c_{n_T-1n_T}(k) = -\frac{r_{n_T-1n_T}(k)c_{n_Tn_T}(k)}{r_{n_T-1n_T-1}(k)}.$$

Similarly, computation of noise coefficients $c_{ij}(k)$ may be extended to a general case as:

$$c_{ij}(k) = \begin{cases} \frac{1}{r_{ii}(k)} & ; \text{ for } i=j \\ 0 & ; \text{ for } i>j \\ -\frac{\sum_{m=i+1}^{j} r_{im}(k)c_{mj}(k)}{r_{ii}(k)} & ; \text{ for } i<j \end{cases} \quad (16)$$

wherein, noise coefficient $c_{ij}(k)$ is a contribution of noise term in $j^{th}$ stream to an overall noise $z_i(k)$ in an $i^{th}$ stream.

Now, when MMSE Flag=1, then NCCU 308 in QR-ZF MIMO detector may compute noise coefficients in each stream by repeating above procedure, and noise coefficient $c_{ij}(k)$ of noise term in a $j^{th}$ stream contributing to resultant noise $z_i(k)$ in an $i^{th}$ stream may be obtained as $$c_{ij}(k) = \begin{cases} \frac{1}{r_{ii}(k) - \sigma q_{2,ii}(k)} & ; \text{ for } i=j \\ 0 & ; \text{ for } i>j \\ -\frac{\sum_{m=i+1}^{j}(r_{im}(k) - \sigma q_{2,im}(k))c_{mj}(k)}{r_{ii}(k) - \sigma q_{2,ii}(k)} & ; \text{ for } i<j \end{cases} \quad (17)$$

The soft demapper 306 may also include a SNR scaling unit (SSU) 310 may be employed to estimate an effective SNR $\Gamma_i(k)$ in an $i^{th}$ stream and scale bit LLR, $\Delta(b_i^l(k))$, following equation (10). For data subsymbols $x_i(k)$ assumed to be of unit variance, effective SNR $\Gamma_i(k)$ in an $i^{th}$ stream may be represented as:

$$\Gamma_i(k) = [\sigma_i^2(k)]^{-1} \quad (18)$$

wherein, $\sigma_i^2(k)$ is a variance of effective noise $z_i(k)$ in an $i^{th}$ stream.

Referring equation (18), effective noise variance may need to be computed in each stream for SNR estimation. However, noise variance computation may differ in QR-ZF and QR-MMSE MIMO detectors and is detailed separately for the two detectors in following example embodiments.

When MMSE Flag=0, in a QR-ZF MIMO detector, variance $\sigma_i^2(k)$ of effective noise $z_i(k)$ for an $i^{th}$ stream may be computed directly as:

$$\sigma_i^2(k) = E\{z_i^2(k)\} = \sum_{j=i}^{n_T} |c_{ij}(k)|^2 \sigma^2 \quad (19)$$

Therefore, bit LLR for a bit $b_i^l(k)$ from equation (10) after SNR scaling (ignoring the common term $\sigma^2$ which may not affect the performance) may be expressed as:

$$L(b_i^l(k)) \approx g_i(k)\Delta(b_i^l(k)) \quad (20)$$

wherein, SNR scale factor $g_i(k)$ may be:

$$g_i(k) = [\Sigma_{j=i}^{n_T}|c_{ij}(k)|^2]^{-1} \quad (21)$$

Now when MMSE Flag=1, in QR-MMSE MIMO detector, $Q_1(k)$ obtained by QRD of augmented matrix $H_{aug}(k)$ may not be a unitary matrix and covariance matrix of $\hat{n}(k)$ may be different from $n(k)$. Hence, $z_i(k)$ in terms of original noise vector $n(k)$ may be expressed as:

$$z_i(k) = \sum_{j=i}^{n_T} c_{ij}(k) \sum_{m=1}^{n_T} q_{1,mj}^*(k)n_m(k) \quad (22)$$

Therefore, variance of the effective noise $z_i(k)$ on an $i^{th}$ stream may get computed to be:

$$\sigma_i^2(k) = E\{z_i^2(k)\} = \Sigma_{m=1}^{n_T}|\Sigma_{j=i}^{n_T}c_{ij}(k)q_{1,mj}^*(k)|^2\sigma^2 \quad (23)$$

Bit LLR for $b_i^l(k)$ in a QR based MMSE detector (after ignoring the common term $\sigma^2$ which may not affect the performance) may be represented as given in equation (20), with SNR scale factor $g_i(k)$ as:

$$g_i(k) = [\Sigma_{m=1}^{n_T}|\Sigma_{j=i}^{n_T}c_{ij}(k)q_{1,mj}^*(k)|^2]^{-1} \quad (24)$$

It is also clearly observed that at higher SNRs ($\geq 10$ dB), scale factors derived from a QR based MMSE detector may reduce to those given for its ZF counterpart.

Usefulness of a proposed soft demapper in an example embodiment, may be easily shown by performing simulations for MIMO-OFDM system. In simulations, 802.11ac WLAN system with 2 transmit antennas and 2 receive antennas may be considered. All simulations may be performed for VHT frame format with two spatial streams operating on 40 MHz channel bandwidth. The transmitted signal may be passed through analog front end (AFE) section with analog filters, DAC/ADC, TG-ac channel model and RF impairments. MIMO channel may introduce path-loss and shadow fading to a transmitted output signal. 1000 different realizations of channel and noise may be considered. On receiver side, timing and frequency synchronizations may be performed before estimating MIMO channel. Then, bit LLR's using proposed method may be computed. The computed bit LLR's may be passed through a deinterleaver, stream deparser and decoded using a soft input Viterbi decoder.

In the present simulations, bit LLR's in the proposed method may be computed using equation (20) with scale factors for QR based ZF detector given in equation (21). In existing QR-MMSE method, as the computation of bit LLR's from resultant signal model is not given, bit LLR's in proposed methods and apparatuses may be computed by calculating the SNR from a signal model and substituting it in equation (10) and may also be computed using near-optimum ML bit metrics.

Figure 4:
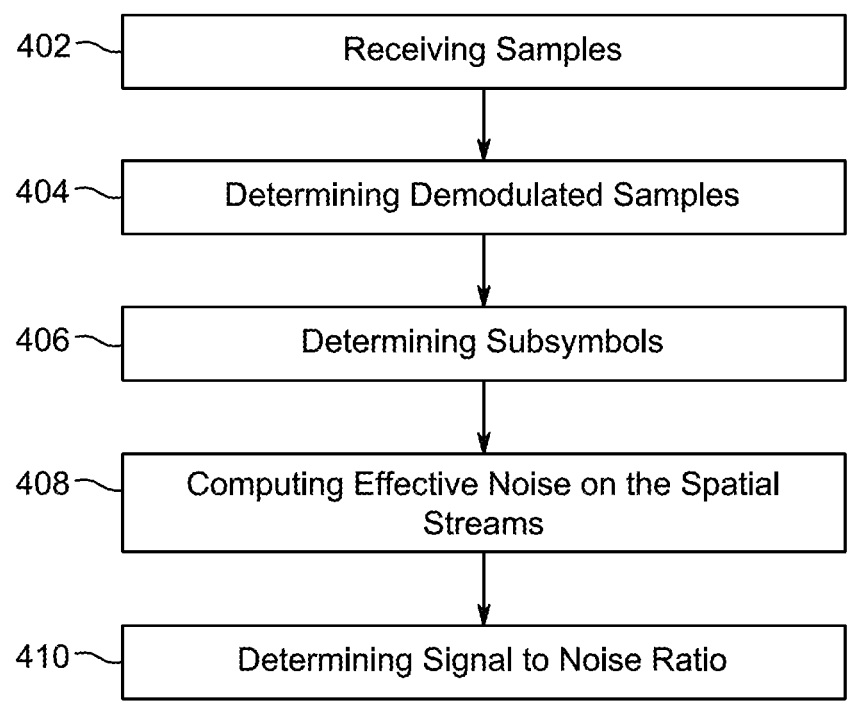
FIG. 4 is a flowchart illustrating a method for calculating log-likelihood ratios, according to an example embodiment.

FIG. 4 is a flowchart illustrating a method for calculating log-likelihood ratios, according to an example embodiment.

At step 402, samples of one or more spatial streams are received by the communication receiver. At step 404, one or more demodulated samples of the received samples are determined by applying one or more discrete Fourier transforms. At step 406, one or more subsymbols from the demodulated samples are determined by utilizing a MIMO detection method. In one aspect, the MIMO detection method is minimum mean squared error (MMSE) method. In another aspect, the MIMO detection method is zero forcing (ZF) method.

At step 408, calculating a log-likelihood ratio for each bit of one or more subsymbols of each of the one or more spatial streams. The step of calculating log-likelihood ratio for each bit comprises computing effective noise on one or more spatial streams after considering noise terms resulting from the MIMO detection estimates of one of more subsymbols on one or more spatial streams. The log likelihood ratio for a bit is equal to $\Gamma_i(k)\Delta(b_i^l(k))$, wherein $\Gamma_i(k)$ is the effective signal to noise ratio in $i^{th}$ spatial stream and $k^{th}$ subcarrier, and $b_i^l(k)$ is the $l^{th}$ bit of the subsymbol $x_i(k)$ in the $k^{th}$ subcarrier and $i^{th}$ stream.

Finally at step 410, signal to noise ratio is determined on one or more spatial streams from the effective noise and scaling bit log-likelihood ratios with the signal to noise ratio. The effective signal to noise ratio in $i^{th}$ spatial stream and $k^{th}$ subcarrier is a function of effective noise term $z_i(k)$ in the $i^{th}$ spatial stream, wherein $$z_i(k) = \sum_{j=i}^{n_T} c_{ij}(k)\hat{n}_j(k)$$

such that $c_{ij}(k)$ is the coefficient of contribution corresponding to the contribution of the noise term in the $j^{th}$ stream to the overall noise in the $i^{th}$ stream.

In case, the MIMO detection method is minimum mean squared error (MMSE) method then the coefficient of contribution $c_{ij}(k)$ as calculated above is equal to $$c_{ij}(k) = \begin{cases} \dfrac{1}{r_{ii}(k) - \sigma q_{2,ii}(k)} & ; \text{for } i = j \\ 0 & ; \text{for } i > j \\ -\dfrac{\sum_{m=i+1}^{j}(r_{im}(k) - \sigma q_{2,im}(k))c_{mj}(k)}{r_{ii}(k) - \sigma q_{2,ii}(k)} & ; \text{for } i < j \end{cases}$$

where $r_{ii}(k)$ are the elements of an upper triangular matrix for $i^{th}$ spatial stream and $k^{th}$ subcarrier, $\sigma^2$ is the noise variance of complex Additive white Gaussian noise, $q_{2ij}(k)$ is an element of a matrix obtained by performing QR decomposition on an augmented channel matrix.

In another case, the MIMO detection method is zero forcing (ZF) method then the coefficient of contribution $c_{ij}(k)$ as calculated above is equal to $$c_{ij}(k) = \begin{cases} \dfrac{1}{r_{ii}(k)} & ; \text{for } i = j \\ 0 & ; \text{for } i > j \\ -\dfrac{\sum_{m=i+1}^{j} r_{im}(k)c_{mj}(k)}{r_{ii}(k)} & ; \text{for } i < j \end{cases}$$

where $r_{ii}(k)$ are the elements of an upper triangular matrix for $i^{th}$ spatial stream and $k^{th}$ subcarrier.

Figure 5:
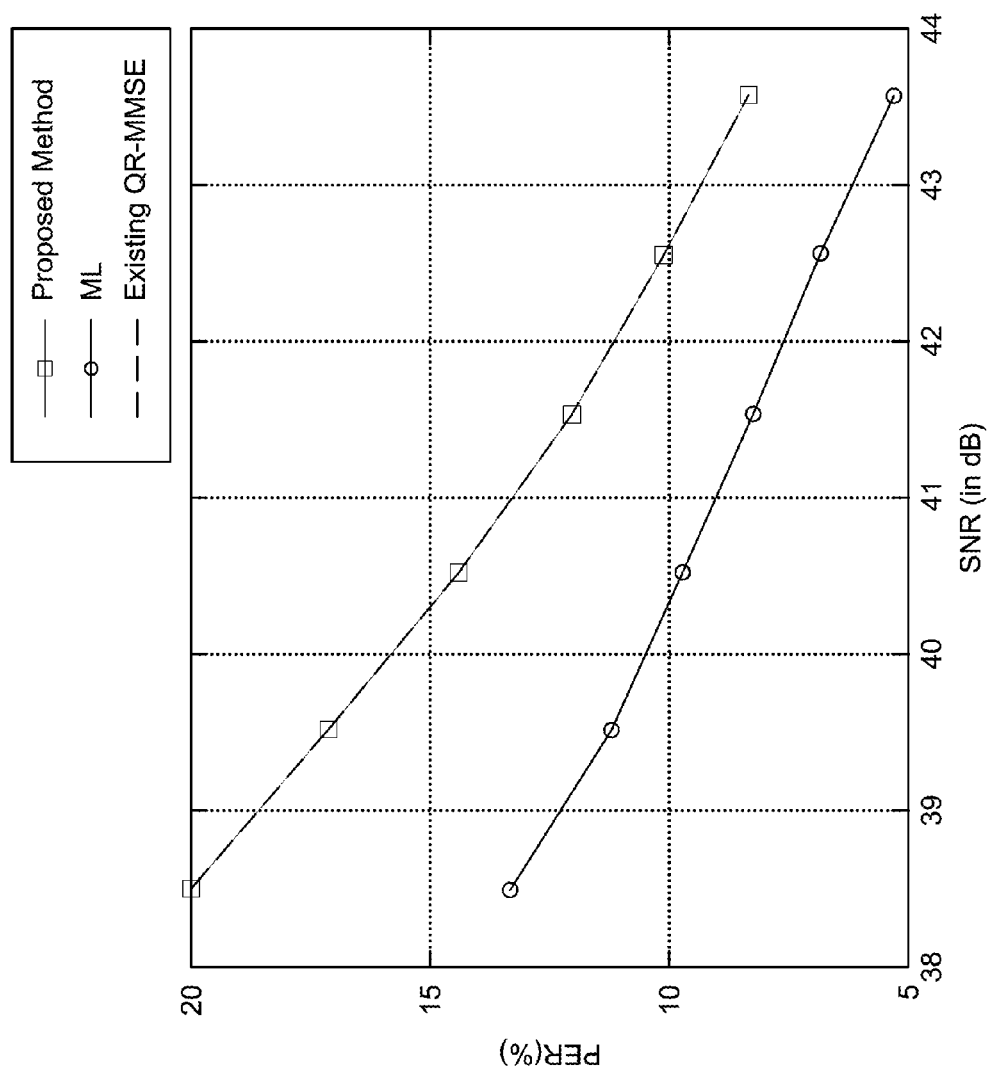
FIG. 5 illustrates a PER Performance in TGac channel model A for 2×2 VHT frame with MCS7, according to an example embodiment.
Figure 6:
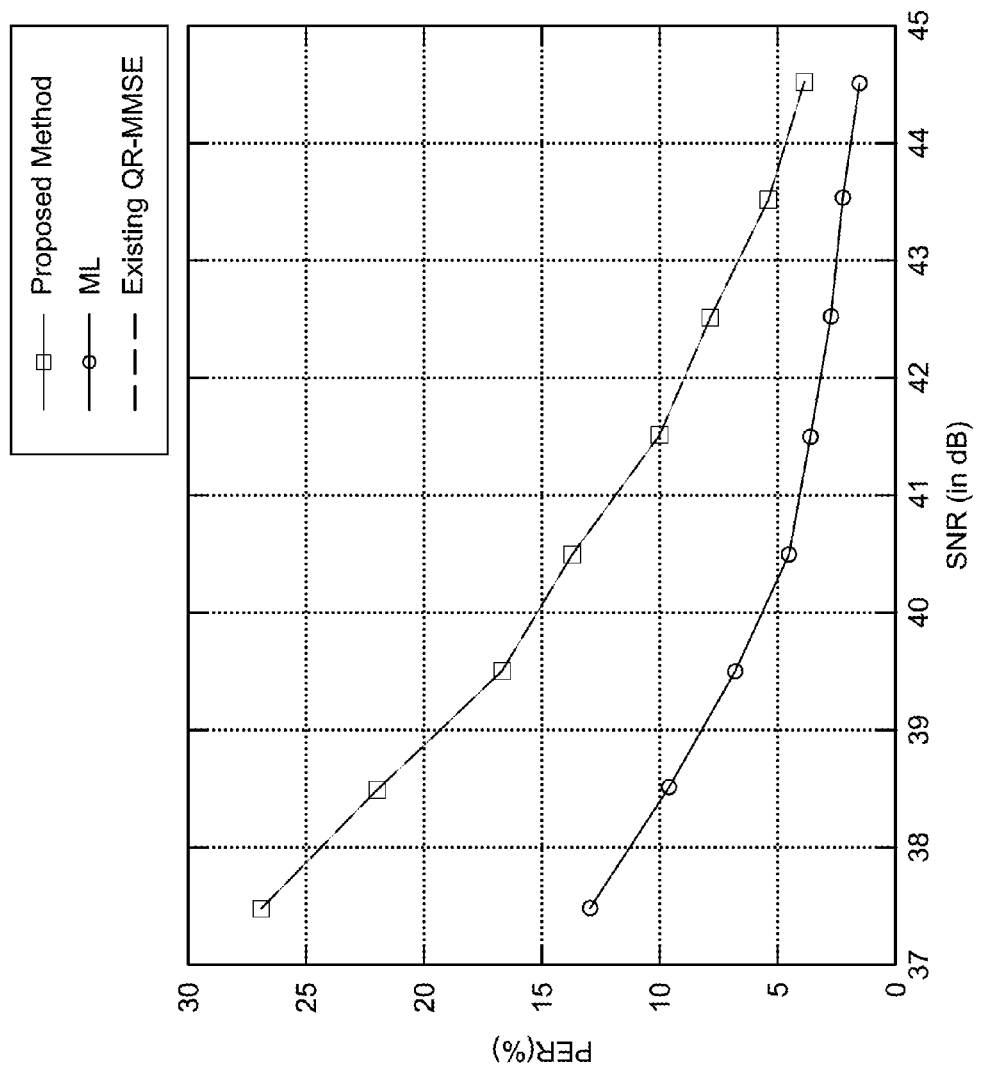
FIG. 6 illustrates a PER Performance in TGac channel model D for 2×2 VHT frame with MCS7, according to an example embodiment.

FIG. 5 illustrates a PER Performance in TGac channel model A for 2×2 VHT frame with MCS7, according to an example embodiment. Further, FIG. 6 illustrates a PER Performance in TGac channel model D for 2×2 VHT frame with MCS7, according to an example embodiment. FIGS. 5 and 6 which show PER performance of a 2×2 WLAN system with a proposed method, near-optimum ML and existing QR-MMSE technique for VHT frame format and MCS 7 (64-QAM modulation and code rate 5/6) in channel model A (flat fading channel) and channel model D (frequency selective channel) respectively.

From FIG. 5 and FIG. 6, it may be clearly noticed that proposed methods and apparatuses, and QR-MMSE method may perform similarly in both channel models and may remain inferior to that of near-optimal ML by approximately 3 dB. However, the computational complexity of proposed methods and apparatuses is significantly less compared to both near-optimal ML method and existing QR-MMSE method. As scale factors derived for a QR based MMSE detector reduce to those given for its ZF counterpart, for SNR's considered herein, PER performance of a proposed MMSE detector is same as that of the proposed ZF detector.

Finally, for a square matrix of size n, the complexity analysis of a QR-MMSE MIMO detector with proposed method is compared with that of the existing QR-MMSE method in Table 1.

TABLE 1

Complexity analysis of the proposed method with the existing QR MMSE method

| Operations | Proposed QR MMSE Method | Existing QR MMSE Method |
|---|---|---|
| Multiplications | $2n^3 - 5n^2 - 7n + 3$ | $2n^4 + 2n^3 - 4n^2 + 4n$ |
| Divisions | $2n - 1$ | $n(n - 1)$ |
| Square Root | $n - 1$ | $n(n - 1)$ |
| Cordic units for phase estimation | $n - 1$ | $n(n - 1)$ |

In the complexity analysis, Householder Reflection may be employed for QR decomposition of the square matrix with complex elements. Also, each complex multiplication may be considered to have been implemented using 3 real multipliers.

The techniques described herein may be used for various wireless communication networks such as Orthogonal Frequency Division Multiplexing (OFDM) networks, Time Division Multiple Access (TDMA) networks, Frequency Division Multiple Access (FDMA) networks, Orthogonal FDMA (OFDMA) networks, Single-Carrier FDMA (SC-FDMA) networks, Code Division Multiple Access (CDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (e.g., WiMAX (Worldwide Interoperability for Microwave Access)), IEEE 802.20, Flash-OFDM®, etc. UTRA, E-UTRA, and GSM are part of Universal Mobile Telecommunication System (UMTS). Long Term Evolution (LTE)

and Long Term Evolution Advanced (LTE-A) are upcoming releases of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE and LTE-A. The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

In an example embodiment, a non-transient computer-readable medium may be provided comprising instructions for causing a programmable processor to receive, by the communication receiver, samples of one or more spatial streams. Then, determining one or more demodulated samples of the received samples by applying one or more discrete Fourier transforms. Thereafter, determining one or more subsymbols from the demodulated samples by utilizing a MIMO detection method. A log-likelihood ratio is calculated for each bit of one or more subsymbols of each of the one or more spatial streams, wherein calculating log-likelihood ratio for each bit comprises of computing effective noise on one or more spatial streams after considering noise terms resulting from the MIMO detection estimates of one of more subsymbols on one or more spatial streams. Finally, the processor may enable determining signal to noise ratio on one or more spatial streams from the effective noise and scaling bit log-likelihood ratios with the signal to noise ratio.

Though the example embodiments described herein are related to MIMO-OFDM system, however, the methods, apparatuses, and systems described herein may also be used for various broadband wireless communication systems including Orthogonal Frequency Division Multiple Access (OFDMA) systems, Single-Carrier Frequency Division Multiple Access (SC-FDMA) systems, and the like without deviating from the essence of the disclosure.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for decoding multiple input multiple output (MIMO) signals by calculating log-likelihood ratios in a communication receiver, the method comprising:
   receiving, by the communication receiver, samples of one or more spatial streams;
   determining one or more demodulated samples of the received samples by applying one or more discrete Fourier transforms;
   determining one or more subsymbols from the demodulated samples by utilizing a multiple input multiple output (MIMO) detection method;
   calculating a log-likelihood ratio for each bit of one or more subsymbols of each of the one or more spatial streams by using $\Gamma_i(k)\Delta(b_i^l(k))$, wherein $\Gamma_i(k)$ is an effective signal to noise ratio in $i^{th}$ spatial stream and $k^{th}$ subcarrier, $b_i^l(k)$ is $l^{th}$ bit of subsymbol $x_i(k)$ in the $k^{th}$ subcarrier and the $i^{th}$ spatial stream, and $\Delta$ indicates calculating the log-likelihood ratio of $b_i^l(k)$ without considering the effective signal to noise ratio in the $i^{th}$ spatial stream and the $k^{th}$ subcarrier, and wherein k, l, and i are integers, and wherein the calculating of the log-likelihood ratio for each bit further comprises:
   computing an effective noise on the one or more spatial streams after considering noise terms resulting from the multiple input multiple output (MIMO) detection estimates of the one or more subsymbols on the one or more spatial streams,
   wherein the effective noise of the $i^{th}$ spatial stream and the $k^{th}$ subcarrier is computed using $z_i(k) = \Sigma c_{ij}(k)\hat{n}_j(k)$ such that $c_{ij}(k)$ is a coefficient of contribution corresponding to a contribution of a noise term in a $j^{th}$ stream to overall noise in the $i^{th}$ spatial stream and $\hat{n}_j(k)$ is Additive White Gaussian noise in the $j^{th}$ stream, and wherein j is an integer; and
   determining signal to noise ratio on the one or more spatial streams from the effective noise and scaling bit log-likelihood ratios with the signal to noise ratio, thereby decoding the multiple input multiple output (MIMO) signals using the bit log-likelihood ratios.

2. The method as claimed in claim 1, wherein the communication receiver is a baseband multiple input multiple output (MIMO)-orthogonal frequency division multiplexing (OFDM) communication receiver.

3. The method as claimed in claim 1, wherein the MIMO detection method is minimum mean squared error (MMSE) method.

4. The method as claimed in claim 3, wherein the coefficient of contribution $c_{ij}(k)$ is equal to $$c_{ij}(k) = \begin{cases} \dfrac{1}{r_{ii}(k) - \sigma q_{2,ii}(k)} & ; \text{for } i = j \\ 0 & ; \text{for } i > j \\ -\dfrac{\sum_{m=i+1}^{j} (r_{im}(k) - \sigma q_{2,im}(k))c_{mj}(k)}{r_{ii}(k) - \sigma q_{2,ii}(k)} & ; \text{for } i < j \end{cases}$$

where $r_{ij}(k)$ are the elements of an upper triangular matrix for $i^{th}$ spatial stream and $k^{th}$ subcarrier, $\sigma$ is a standard deviation of a complex Additive white Gaussian noise, and $q_{2,ij}(k)$ is an element of a matrix obtained by performing QR decomposition on an augmented channel matrix.

5. The method as claimed in claim 1, wherein the MIMO detection method is a zero forcing method.

6. The method as claimed in claim 5, wherein the coefficient of contribution is $$c_{ij}(k) = \begin{cases} \dfrac{1}{r_{ii}(k)} & ; \text{for } i = j \\ 0 & ; \text{for } i > j \\ -\dfrac{\sum_{m=i+1}^{j} r_{im}(k)c_{mj}(k)}{r_{ii}(k)} & ; \text{for } i < j \end{cases}$$

where $r_{ii}(k)$ are elements of an upper triangular matrix for the $i^{th}$ spatial stream and the $k^{th}$ subcarrier, obtained by performing QR decomposition of a channel matrix.

7. A communication receiver comprising a multiple input multiple output (MIMO) detector for decoding MIMO signals by calculating log-likelihood ratios, wherein the MIMO detector comprises:
  a QR decomposition processor configured to compute QR decomposition of an augmented multiple input multiple output (MIMO) channel matrix corresponding to one or more spatial streams on one or more subcarriers;
  a Backsolving processor configured to compute MIMO detection estimates of one or more subsymbols corresponding to the one or more spatial streams on the one or more subcarriers;
  a Soft demapper processor configured to compute bit log-likelihood ratios of each bit of the one or more subsymbols corresponding to the one or more spatial streams on the one or more subcarriers, the Soft demapper processor comprises:
  a Noise Coefficient Computation processor configured for calculating an effective noise term $z_i(k)$ in $i^{th}$ spatial stream on $k^{th}$ subcarrier, wherein $z_i(k)=\Sigma c_{ij}(k)\hat{n}_j(k)$ such that coefficient $c_{ij}(k)$ corresponds to a contribution of a noise term in a $j^{th}$ stream to overall noise in the $i^{th}$ spatial stream on the $k^{th}$ subcarrier and $\hat{n}_j(k)$ is Additive White Gaussian noise in the $j^{th}$ stream, and wherein i, j, and k are integers; and
  an SNR scaling processor configured for estimating signal to noise ratio from the effective noise term $z_i(k)$ in the $i^{th}$ spatial stream and computing the bit log likelihood ratio for each of the encoded bits of the subsymbol in the $i^{th}$ spatial stream on the $k^{th}$ subcarrier, wherein the bit log likelihood ratio is a function of effective signal to noise ratio in the $i^{th}$ spatial stream which is estimated after considering the noise terms resulting from the MIMO detection estimation of the One or more subsymbols corresponding to the one or more spatial streams on the one or more subcarriers, thereby decoding the multiple input multiple output (MIMO) signals using the bit log-likelihood ratios.

8. A non-transient computer-readable medium comprising program instructions executed by a programmable processor to decode multiple input multiple output (MIMO) signals by calculating log-likelihood ratios in a communication receiver by performing:
  receiving, by a communication receiver, samples of one or more spatial streams;
  determining one or more demodulated samples of the received samples by applying one or more discrete Fourier transforms;
  determining one or more subsymbols from the demodulated samples by utilizing a multiple input multiple output (MIMO) detection method;
  calculating a log-likelihood ratio for each bit of one or more subsymbols of each of the one or more spatial streams by using $\Gamma_i(k)\Delta(b_i^l(k))$, wherein $\Gamma_i(k)$ is an effective signal to noise ratio in $i^{th}$ spatial stream and $k^{th}$ subcarrier, $b_i^l(k)$ is $l^{th}$ bit of subsymbol $x_i(k)$ in the $k^{th}$ subcarrier and the $i^{th}$ spatial stream, and $\Delta$ indicates calculating the log-likelihood ratio of $b_i^l(k)$ without considering the effective signal to noise ratio in the $i^{th}$ spatial stream and the $k^{th}$ subcarrier, and wherein k, l, and i are integers, and wherein the calculating the log-likelihood ratio for each bit further comprises:
  computing an effective noise on the one or more spatial streams after considering noise terms resulting from the multiple input multiple output (MIMO) detection estimates of the one or more subsymbols on the one or more spatial streams,
  wherein the effective noise of the $i^{th}$ spatial stream and the $k^{th}$ subcarrier is computed using $z_i(k)=\Sigma c_{ij}(k)\hat{n}_j(k)$ such that $c_{ij}(k)$ is a coefficient of contribution corresponding to a contribution of a noise term in the $j^{th}$ stream to overall noise in the $i^{th}$ spatial stream and $\hat{n}_j(k)$ is Additive White Gaussian noise in the $j^{th}$ stream, and wherein j is an integer; and
  determining signal to noise ratio on the one or more spatial streams from the effective noise and scaling bit log-likelihood ratios with the signal to noise ratio, thereby decoding the multiple input multiple output (MIMO) signals using the bit loci-likelihood ratios.

9. The non-transient computer-readable medium of claim 8, wherein the non-transient computer-readable medium is a field-programmable gate array.

* * * * *